Nov. 30, 1948.                    V. O. GITTUS                    2,455,116
                        METHOD OF AND APPARATUS FOR MEASURING
Filed July 24, 1945         THE COLOR QUALITY OF LIGHT
                                                         3 Sheets-Sheet 1
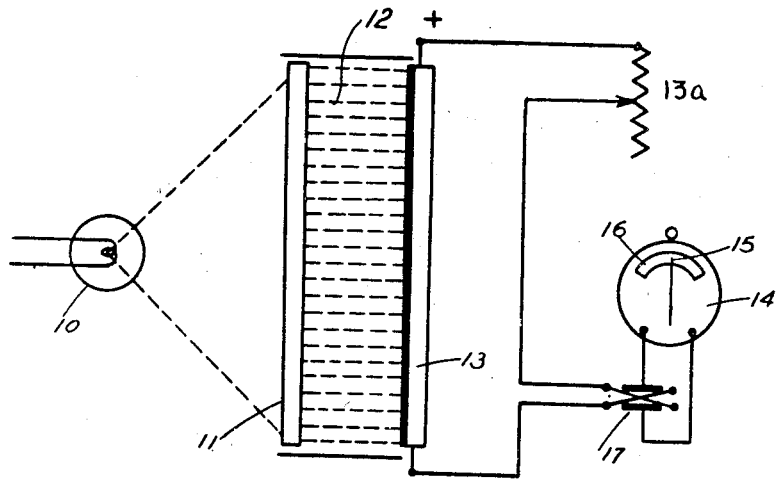
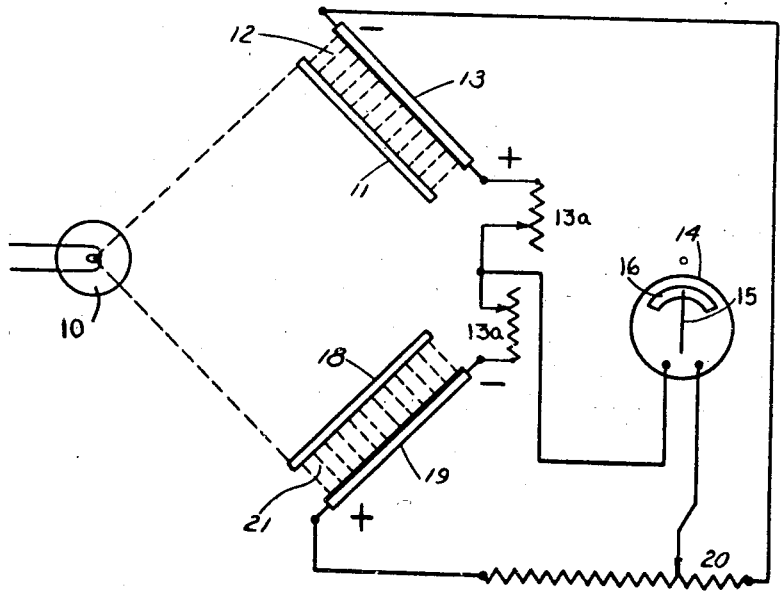
INVENTOR
VIRGIL O. GITTUS
BY
ATTORNEYS

INVENTOR
VIRGIL O. GITTUS
ATTORNEYS

Nov. 30, 1948.                V. O. GITTUS                 2,455,116
                METHOD OF AND APPARATUS FOR MEASURING
                        THE COLOR QUALITY OF LIGHT
Filed July 24, 1945                              3 Sheets-Sheet 3
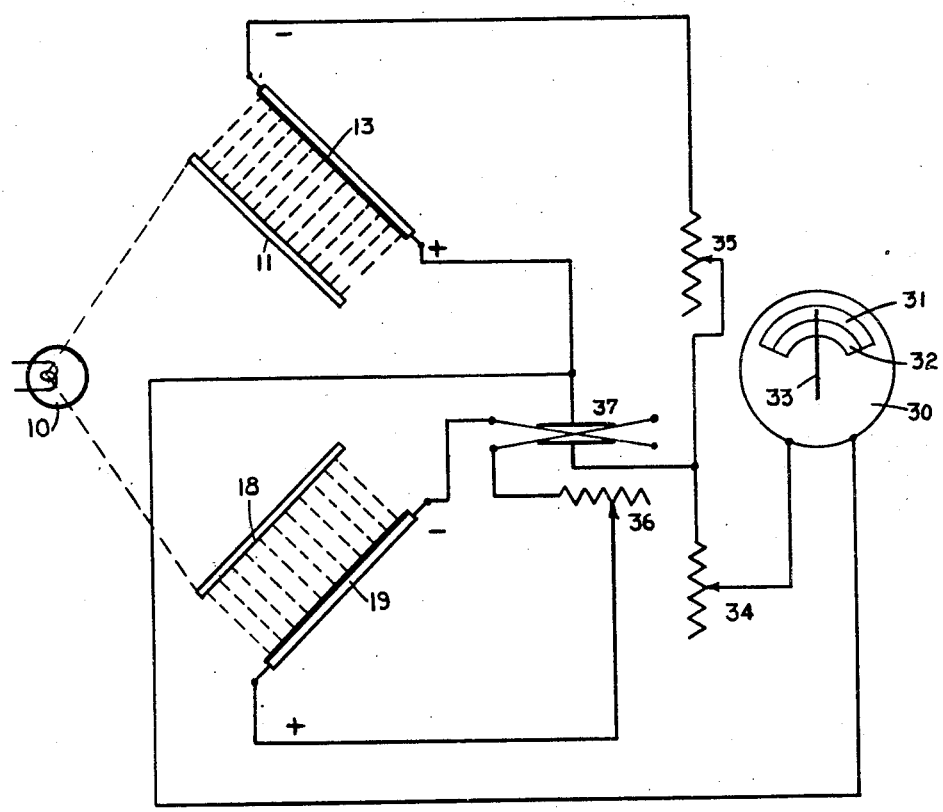
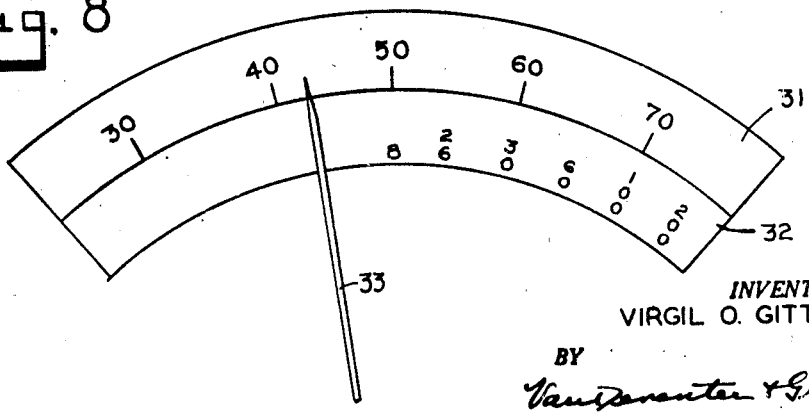
INVENTOR.
VIRGIL O. GITTUS
BY
*Van Deventer & Grier*
ATTORNEYS Patented Nov. 30, 1948

2,455,116

UNITED STATES PATENT OFFICE 2,455,116

METHOD OF AND APPARATUS FOR MEASURING THE COLOR QUALITY OF LIGHT

Virgil O. Gittus, Brooklyn, N. Y.

Application July 24, 1945, Serial No. 606,781

8 Claims. (Cl. 88—22.5)

This invention relates to a method of and apparatus for measuring the color quality of light, and is particularly useful in photography where color film is used, but may be used for many other purposes as will be apparent from the following specification.

An object is to provide a method for measuring the color quality of light which can be used by anyone—even if color blind.

Another object is to provide a method which does not require a standard source of light at the place where the device is being used; for example, a photographer taking scenes in the open does not require a standard source of light when using the invention in the field and after the instrument is once calibrated for comparison purposes.

Another object is to provide a method which permits the control of the quality of artificial illumination used in photography so that proper balance is obtained in the final color photograph.

Another object is to provide apparatus suitable for practicing the method herein disclosed that is simple and inexpensive to construct, readily portable and easy to use.

Other objects will be apparent from the following specification which discloses a preferred form of apparatus that may be used to practice the method herein disclosed. It will be understood, however, that this disclosure is illustrative but not limitative, the invention being as defined in the appended claims. Obviously, the method may be practiced with any suitable apparatus.

In the accompanying drawings:

Figure 1 is a diagram showing one arrangement of apparatus for carrying out the method herein disclosed;

Figure 2 is a diagram showing an alternate arrangement of apparatus for carrying out the method herein disclosed;

Figure 7 is a diagram showing one alternate arrangement of apparatus for carrying out the method herein disclosed; and Figure 8 is an enlarged plan view of the scale of the instrument shown in Figure 7.

Figure 3:
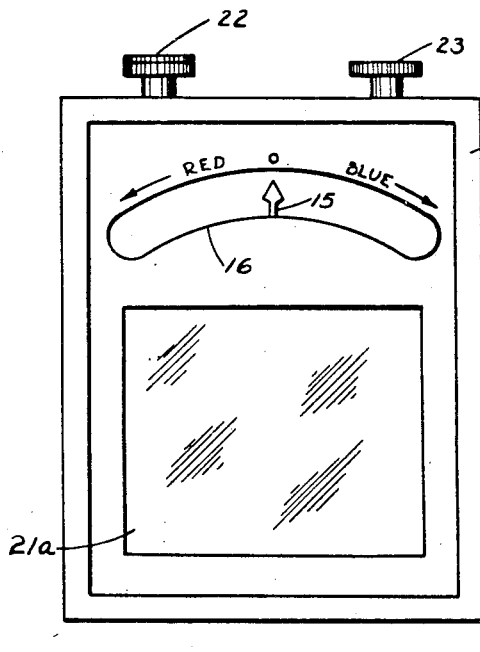
Figure 3 is a front view of a complete unit instrument suitable for practicing the method herein disclosed.

The method and apparatus herein described enables the color photographer to measure the color quality of his illumination, either artificial light or daylight. This method of measuring color quality does not tell anything about the brightness level of the illumination and should not be confused with the results obtained with ordinary exposure meters or devices which measure lumens.

It is important to measure color quality, for color films as such films are made to give correct color rendering for a definite color of light. If the illumination is not of the quality for which the film is balanced, the finished picture will be unsatisfactory.

The color quality of light is conveniently described by its "color temperature." In defining color temperature a perfect source of radiation is taken as standard. If the radiant energy from a lamp has the same visual color as the perfect source, it is said to operate at a color temperature which is the same as the actual temperature of the perfect source of radiation.

Color temperatures are denoted in degrees Kelvin (°K) and are 273° higher than the same temperatures on the centigrade scale. As illustrative of the color temperature of various light sources in °K, it may be pointed out that a 60-watt Tungsten filament lamp is about 2509° K, a 500-watt projection lamp 3190° K, and mean noon sunlight at Washington, D. C. 5400° K. Kodachrome professional Type B is made to give correct color rendering when exposed to light at a color temperature of 3200° K. Any variation in the current supply, electric lamps, and often the age of the lamp itself causes a color temperature difference which will affect the film. If electric lamps are operated at color temperatures below 3200° K the picture will appear warm in hue, while if they are run at higher values than 3200° K the results will be bluish or cold in color. This applies to many other colored films, and to three-color one-exposure cameras. In practice it is found that a color temperature difference of about 100° K can be picked up on Kodachrome film.

The instant invention is intended to permit control of the quality of illumination so that proper color balance is obtained in the final color photograph. By employing this method a direct measure of the color temperature of the light falling on the subject can be made, and if this temperature is the same as that from which the film is balanced, the exposure may be made with the knowledge that the results will be satisfactory as far as the color quality of the actual illumination is concerned.

The method as herein described employs the step of photo-electrically measuring at least one of the color components of the light source, and preferably the red and blue components thereof, and employs what is commonly termed a photoelectric cell or tube. The particular cells disclosed herein are usually called photovoltaic cells and usually comprise a thin metallic disc coated with a film of light-sensitive material and sealed in a moisture proof case with a glass window and provided with suitable terminals. Such cells generate a current proportional to the light intensity to which they are exposed, and in connection with the present method, require no amplifier, batteries, or auxiliary equipment. It will be understood, however, that any suitable type of photoelectric or light-sensitive cell can be used employing any one of the well known forms of amplifiers and a suitable source of current.

The photo-cell in this method is connected to a suitable indicating instrument, and for the sake of simplicity the indicating instrument described herein is an ordinary microammeter, such as is commonly employed for a wide variety of purposes, but it will be understood that any suitable kind of indicating instrument can be used, such as a galvanometer, or any other device that will visually indicate to the user the changes that occur in the photo-cell circuits.

Referring to Figure 1, the numeral 10 denotes the light source, the color temperature of which is to be measured. This can be daylight or it can be an electric lamp as shown.

Light from the source 10 impinges upon the filter 11, which may be a suitable red filter, and the filtered light as indicated at 12 impinges on a suitable photo-cell indicated at 13 connected to the indicating instrument 14. This is preferably a center zero type of instrument having a pointer and scale, and it will be assumed that with a red filter at 11 and the photo-cell 13 connected as shown, the pointer 15 will swing to the left, and the amount of such movement may be read on the scale 16, the reversing switch 17 being thrown to the left.

Assuming that a blue filter is substituted for the red filter at 11 and that the reversing switch 17 is thrown to the right, the pointer 15 will be deflected to the right.

From the foregoing it will be seen that by using alternate red and blue filters, measurements can be made of the red and blue components of the light source 10. Other colored filters may be used.

The reversing switch 17 is used to give a left-right reading for different colors, and this simplifies calculations in some instances and also enables a double scale instrument to be used, as more fully described in connection with Figure 7. Obviously, the switch 17 can be omitted and all readings start from 0 at the left hand end of the scale.

To calibrate the apparatus, Figure 1, the photocell 13 is exposed to a standard light source, and a suitable resistance 13ª in series and shunt with the cell 13 or the meter 14 is adjusted until the pointer 15 gives the desired indication on scale 16. This may be assumed to be at either end of the scale on a center scale instrument as shown in Figure 1 (switch 17 being thrown alternately in both directions) or at the extreme right on a scale having 0 on the left. This reading will represent 100% of the value of the light, as it will include all colors.

Instead of making this adjustment by varying a resistance in circuit with the cell, it may be done in any other manner, as for example by means of a suitable iris diaphragm placed over cell 13 instead of filter 11.

If now a red filter is placed at 11 (the iris diaphragm opening, or the resistance if used, remaining unchanged) the pointer 15 will indicate the percentage of red light in the light being measured. A blue filter at 11 will give the percentage of blue light; a green filter the percentage of green light.

For the sake of simplicity the color filters mentioned herein have been termed "red" or "blue." By these terms is meant a "red" filter passing light from the red end of the spectrum to the center thereof slightly above the D-line in the yellow, and a "blue" filter passing light from the D-line on to the violet end of the spectrum, and not necessarily a pure red or pure blue filter. It is well known that most so-called "blue" filters are really blue-green. A plate or table, such as 21ª Figure 3, may be attached to these instruments giving the necessary data for reading the percentages of colors indicated by the instrument 14.

Such a table may be as follows:

| Light (in degrees K) | Percent Red | Percent Green | Percent Blue | Percent Green and Blue |
|---|---|---|---|---|
| 3000 | 54 | 32 | 14 | 46 |
| 3200 | 49 | 34 | 17 | 51 |
| 3435 | 46 | 35 | 19 | 54 |
| 5400 | 33 | 34 | 33 | 67 |

When an 0-center instrument is used, as shown in Figure 1, red may be considered as − (pointer swings left), and blue as + (pointer swings right), switch 17 being thrown to left or right depending upon which scale is to be read. Then, by suitably marking the scale, the °K can be easily read and the difference between the red and blue components readily determined. Such information will be recognized as of value in many photographic operations.

Assuming the meter 14 is calibrated with a white light having a color temperature of 3200° K: If a single red reading of some unknown light shows 49% on the − scale, total color temperature is 3200° K. To check this, using a blue-green filter, if the reading is 51% the figure of 3200° K is confirmed.

By one reading the color temperature may be obtained, but by an additional reading the first reading is checked and verified. By using different colored filters, the percentage of component colors is readily obtained and is of value where colored lighting is employed.

When the color temperature is determined as just described, the photographer selects the proper compensating filter as hereinafter referred to and applies this over the lens of the camera to correct for color in the usual way.

Referring to Figure 2, there is a light source 10, a red filter 11, its associated photocell 13 and the instrument 14 all as previously described, and the additional blue filter 18, a photocell 19 and a variable resistance 20. All the foregoing apparatus is connected in circuit as shown.

Light from the source 10 impinges upon the photocells 13 and 19.

The two photocells are connected in circuit as shown by the plus and minus signs opposite their respective terminals so that the currents generated therein buck or oppose each other. The variable resistance 20 is adjusted with a standard light source at 10 so that the pointer 15 is at zero in the center of the scale 16 when the standard light source has a definite color temperature, for example 3200° K.

The instrument being adjusted as just described, it will be obvious that any variation in the red or blue component of the light source 10, or light reflected onto the photocells 13, 19, will affect one or the other, or both, of them thereby disturbing the balance in the circuit and causing the needle of the instrument 14 to be deflected to the right or the left, thereby giving an indication of the nature and extent of the variation of the light source from its normal or standard condition. In other words, the currents from the photocells 13, 19 oppose each other to affect the predetermined standard setup or calibration of the instrument which has been previously accomplished by adjustment of the resistance 20 (or resistance 13ᵃ in series or shunt with meter 14), and the amount of this deviation of the light source from the predetermined standard can be determined.

Figure 4:
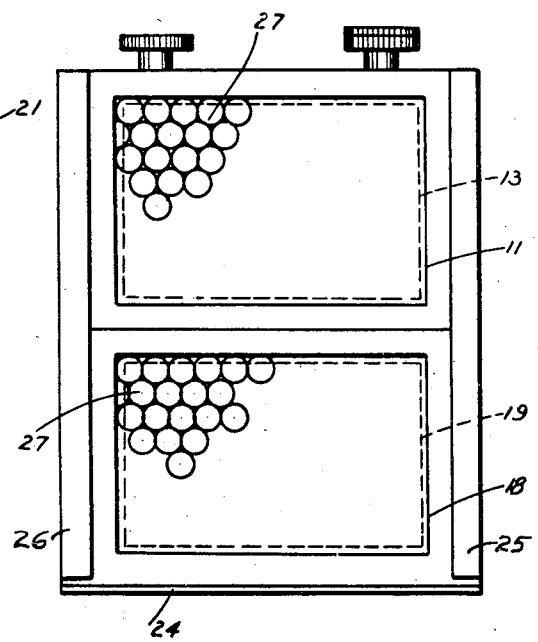
Figure 4 is a rear view of the instrument, Figure 3.
Figure 5:
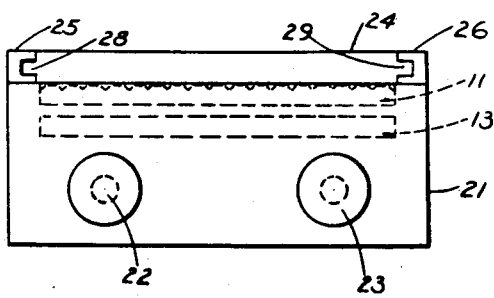
Figure 5 is a top view of the instrument, Figure 3.

For convenience apparatus for practicing the method can be assembled as shown in Figures 3 to 5, inclusive. Only the apparatus of Figure 2 is shown, as the modifications necessary in the apparatus, Figures 3 to 5, to assemble in one unit the apparatus of Figures 1 or 7 will be obvious.

A suitable casing 21 contains the indicating instrument 14 previously described, the pointer 15 of which is seen in Figure 3. As the details of construction of this instrument and its mounting in the casing may be varied within wide limits, they are not discussed in detail. Mounted upon the casing is a knob 22 for operating the variable resistance 20, and knobs such as 23 for operating the switch 17 or resistance 13ᵃ if these be used. Immediately in the rear of the instrument are mounted the photocells 13 and 19 indicated by dotted lines in Figures 4 and 5, and in the rear of these cells and overlying the active light sensitive surfaces thereof are the red filter 11 and the blue filter 18 which form the open rear of the device against which the light to be measured impinges. These filters are easily removable, so that the device can be used without filters when only one cell is used as previously described, or when using the arrangement shown in Figure 7.

Extending around this rear side of the casing is a frame having a bottom portion 24 and two vertical side rails 25 and 26 which are grooved or otherwise shaped as indicated at 28, 29 to receive compensating filters for a purpose hereinafter described.

Figure 6:
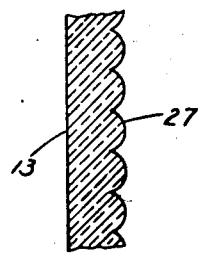
Figure 6 is a sectional view through one of the filters used in the instrument, Figure 3.

It is advisable that the color filters 11, 18 have a lenticular outer surface as indicated in section at 27 in Figure 6, but the outer surface of these filters may be formed in any suitable manner in order that the light impinging thereon may be uniformly diffused over the surface of the filter so as to be uniformly distributed over the active portion of the photocells underlying these filters.

The instrument just described as shown in Figures 3 to 5, inclusive, will greatly resemble an ordinary exposure meter and can be made from 1½ inches to 2 inches square, so that it is readily portable for use by amateur photographers and others in the field. This is one of the advantages of utilizing photovoltaic cells which generate their own current when exposed to light, as no batteries and amplifiers are required which enables the instrument to be made extremely small and portable, all of the necessary parts being included in one unit structure.

In order to read the color temperature according to this method using the apparatus described in connection with Figures 3 to 6 and connected as described in connection with Figure 2, it is necessary to proceed (after the instrument is calibrated) as follows:

The light to be measured may be from a lamp, or any other illuminant, or it may be reflected light from a scene to be photographed, and said scene may be illuminated by sunlight or by artificial light; therefore, the reference herein to "light," or "light quality" is in reference to light from said sources.

Point the rear side of the meter on which is located the filters 11 and 18 in the direction of the light to be measured, and if the color temperature of the illumination is different from the standard for which the instrument has been adjusted as previously described, the difference will be indicated by the pointer 15 in relation to the scale 16 and this scale can be graduated to indicate the compensation necessary. This compensation can be made in some instances by regulating the voltage to the lamps or other illuminants, or it can be effected by using color compensating filters.

Compensating filters to enable the photographer to adjust his light quality, of the light reflected from a scene which he desires to photograph, to the correct value for proper color rendering. I propose to provide these filters in sets of seven, 4 bluish and 3 reddish. The bluish filters are for the purpose of raising the effective color temperature when the quality of light is somewhat lower than that from a source operating at 3200° K, and the reddish or yellowish filters are for lowering the effective temperature of light higher than 3200° K.

To select the proper filter for Kodachrome professional film Type B for example, the instrument having been adjusted for a color temperature of 3200° K, the meter is pointed at the source of light and if it is not in balance the compensating filters are dropped into the grooves 28, 29 in the back of the instrument, coming to rest on the bottom ledge 24 until by trial and error a filter is found which restores the balance of the instrument; that is to say, returns the needle 15 to the zero point in the middle of the scale 16 or to any other point on said scale to which the instrument was initially balanced. When the temperature is higher than 3200° K a yellowish filter is required. When the temperature is lower than 3200° K a bluish filter will be required. The filters are either made in sets where one blue and one yellow filter appears in the same frame, or each blue and each yellow filter can be separate.

Another way of using the apparatus just described in connection with Figures 2 to 6 is to expose cell 13 to the light to be measured without any filter at 13, while cell 19 is exposed to the same light but with a red or blue filter at 18. The resultant indication of meter 14 can be read off a table similar to the table previously given in connection with the apparatus shown in Figure 1 and giving color temperatures in °K.

Figure 7 illustrates another form of apparatus that may be used to practice the herein described method. Here the meter 30 has two scales 31, 32 over which the pointed 33 is moved. The upper scale 31 may be calibrated to read in °K when multiplied by 100 or any other factor. The lower scale 32 may be calibrated for use as an ordinary exposure meter.

The meter 30 is connected in circuit with a variable resistance 34, and each of the variable resistances 35, 36 are in series with one of the photocells 13, 19. The resistances 34, 35, 36 may be in shunt instead of series, or arranged in any series-parallel relationship to permit of their action as herein described.

A reversing switch 37 is connected in the circuit as shown. When this switch is thrown to the right, cells 13 and 19 are in parallel and each augments the other's current output, and the resistances 34, 35, 36 may be adjusted until the meter 30 reads full scale deflection to the right when the cells 13, 19 are exposed to a known light source 10. Without filters 11 and 18 this enables the instrument scale 32 to be used as an ordinary exposure meter, for should the light source 10 vary from standard giving full scale deflection, the pointer 33 will come to rest somewhere to the left of the 200 marking on the scale. The device, therefore, operates to measure light intensity regardless of color values within wide limits.

To read color values, switch 37 is thrown to the left and the cells 13, 19 are then connected so that the currents therefrom oppose each other. Red and blue filters 11 and 18 are now applied over the cells and the instrument may now be used—referring to scale 31—like the instrument described in connection with Figure 2.

What is claimed is:

1. Means for measuring the color quality of light comprising an electrical indicating instrument, a pair of photoelectric cells, a red filter overlying one of said cells, a blue filter overlying the other of said cells, a circuit connecting said cells and said instrument so that currents flowing from said cells when exposed to light passing through said filters are opposed, whereby said instrument will indicate the resultant of said opposed currents, a casing in and upon which the foregoing parts are assembled in cooperative relationship, means on said casing for supporting a compensating color filter in front of at least one of said first filters, and a compensating color filter adapted to be removably supported by said means whereby said filter may be changed at will while said first filters and photoelectric cells remain in fixed relation to said instrument and casing.

2. The invention as claimed in claim 1 including means in said casing connected to said circuit whereby the relative strength of said currents flowing from said cells can be manually adjusted to vary the indications of said instrument.

3. In apparatus of the class described, a casing, an indicating instrument in the front of said casing having a scale and pointer, a pair of photocells in the rear of said casing and supported therein so that their light sensitive elements may be exposed to light impinging upon the rear of said casing, a red filter overlying the sensitive face of one of said cells, a blue filter overlying the sensitive face of the other of said cells, connections within said casing and extending between said cells and said instrument, whereby the latter may be operated by the conjoint action of said cells, and means for removably supporting a preselected compensating filter in overlying relation of said first filter.

4. The apparatus as claimed in claim 3 including a variable resistance connected in circuit with at least one of said cells for varying the output thereof.

5. The apparatus as claimed in claim 3 including a variable resistance connected in circuit with at least one of said cells for varying the output thereof, and means extending through a wall of said casing whereby said resistance can be manually adjusted.

6. A method of photographing a subject in color with a camera having a color film therein, the reflected light from said subject having unknown color characteristics, said method including filtering the red and the blue components of said reflected light to produce substantially the same balance as that produced by arranging in balanced opposition the photoelectric responses to the red components and to the blue components of light of known color characteristics, and the final steps of positioning the filter which produced said first mentioned balance adjacent to the lens of said camera and exposing said film to said reflected light after it passes through said filter.

7. In an instrument of the class described, a casing having an apertured wall, a pair of photoelectric cells mounted in said casing behind the aperture in said wall, said cells being adapted to generate currents when exposed to light, a red filter spanning one of said cells, a blue filter spanning the other of said cells, a meter movement in said casing having a scale, a pointer for said scale having a normal zero position on the center of said scale, a reversing switch in said instrument; circuits in said casing interconnecting said cells, said meter, and said switch arranged to connect said cells in bucking relation through said meter when said switch is in one position and arranged to connect said cells and said meter in multiple when said switch is in another position; and a frame support on said wall for supporting a compensating filter to span said cells.

8. An instrument according to claim 7, in which said scale carries one set of graduations in terms of color temperature to be used when said switch is in said first mentioned position, and another set of graduations in terms of exposure time to be used when said switch is in the other position.

VIRGIL O. GITTUS.

REFERENCES CITED

The following references are of record in the file of this patent:

UNITED STATES PATENTS

| Number | Name | Date |
|---|---|---|
| 1,898,219 | Sharp | Feb. 21, 1933 |
| 2,147,902 | Jakosky | Feb. 21, 1939 |
| 2,203,036 | Van Briessen et al. | June 4, 1940 |
| 2,237,713 | Russell | Apr. 8, 1941 |
| 2,302,554 | Kingsbury | Nov. 17, 1942 |
| 2,308,095 | Meeder | Jan. 12, 1943 |
| 2,382,220 | Fogle | Aug. 14, 1945 |

FOREIGN PATENTS

| Number | Country | Date |
|---|---|---|
| 113,865 | Great Britain | 1918 |
| 473,654 | Great Britain | Oct. 15, 1937 |

OTHER REFERENCES

"Photocells and Their Application," by Zworykin et al., 2nd edition, publ. 1934; pages 228 and 229 cited.

"A Photoelectric Color Temperature Meter for Incandescent Lamps," an article by M. H. Sweet in Journal of the Optical Society of America for November 1940; pages 568 to 571 cited.

"Color Quality Indicator," an article by H. L. Woodward, Jr., in American Photography for June 1944; pages 36 and 37 cited.